United States Patent [19]

Dyer et al.

[11] Patent Number: 5,592,729
[45] Date of Patent: Jan. 14, 1997

[54] METHOD OF ASSEMBLING AN INFLATABLE CUSHION WITH A REACTION HOUSING IN AN INFLATABLE RESTRAINT SYSTEM

[75] Inventors: David J. Dyer, Kaysville; Larry D. Rose, Layton, both of Utah

[73] Assignee: Morton International, Inc., Chicago, Ill.

[21] Appl. No.: 289,864

[22] Filed: Aug. 12, 1994

[51] Int. Cl.⁶ .............................. B23Q 3/00; B21D 39/00
[52] U.S. Cl. .................. 29/464; 29/508; 29/517
[58] Field of Search .......................... 280/728.2; 29/464, 29/508, 517, 451, 234, 243.517

[56] References Cited

U.S. PATENT DOCUMENTS

| | | |
|---|---|---|
| 2,216,686 | 10/1940 | Fentress . |
| 3,096,876 | 7/1963 | Scudieri . |
| 3,109,231 | 11/1963 | Johnson ..................................... 29/517 |
| 3,304,602 | 2/1967 | Osborne . |
| 3,750,452 | 8/1973 | Frank . |
| 3,824,665 | 7/1974 | Saito . |
| 4,574,444 | 3/1986 | Humpolik . |
| 4,876,788 | 10/1989 | Steer et al. . |
| 5,344,182 | 9/1994 | Lauritzen et al. ..................... 280/728.2 |
| 5,454,588 | 10/1995 | Rose ..................................... 280/728.2 |

FOREIGN PATENT DOCUMENTS 216340  11/1973  Germany ................................. 29/234

Primary Examiner—David P. Bryant
Attorney, Agent, or Firm—Taylor J. Ross; Gerald K. White

[57] ABSTRACT

The invention provides a method and device for assembling an inflatable cushion with a reaction housing in an inflatable restraint system. A die is provided which includes at least one cavity extending through the die, and an elongate slot communicating with the interior of the cavity and disposed along the length thereof. The assembly is accomplished by aligning the die with the reaction housing to permit axial passage of a cushion insert, formed at the gas inlet opening of the inflatable cushion, through the die cavity into a mateable sleeve of the reaction housing.

24 Claims, 8 Drawing Sheets

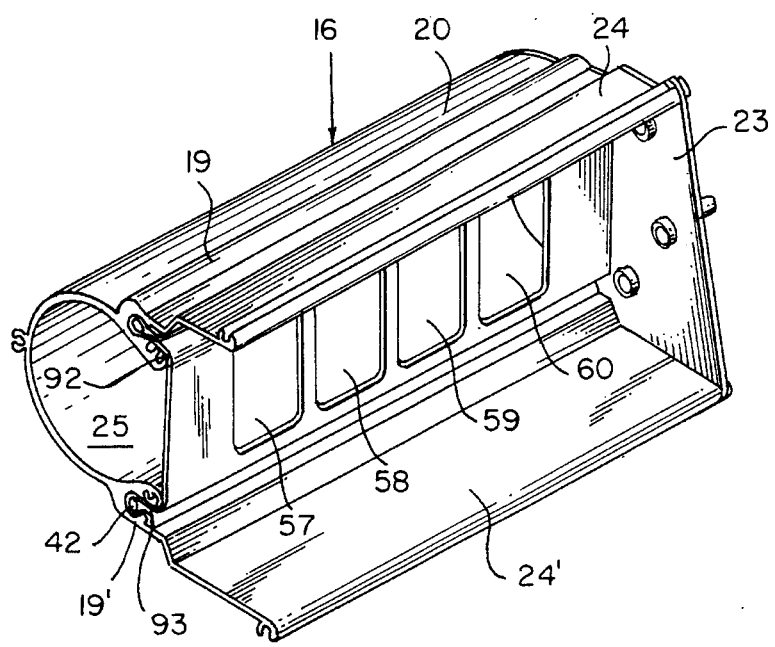
FIG. 5
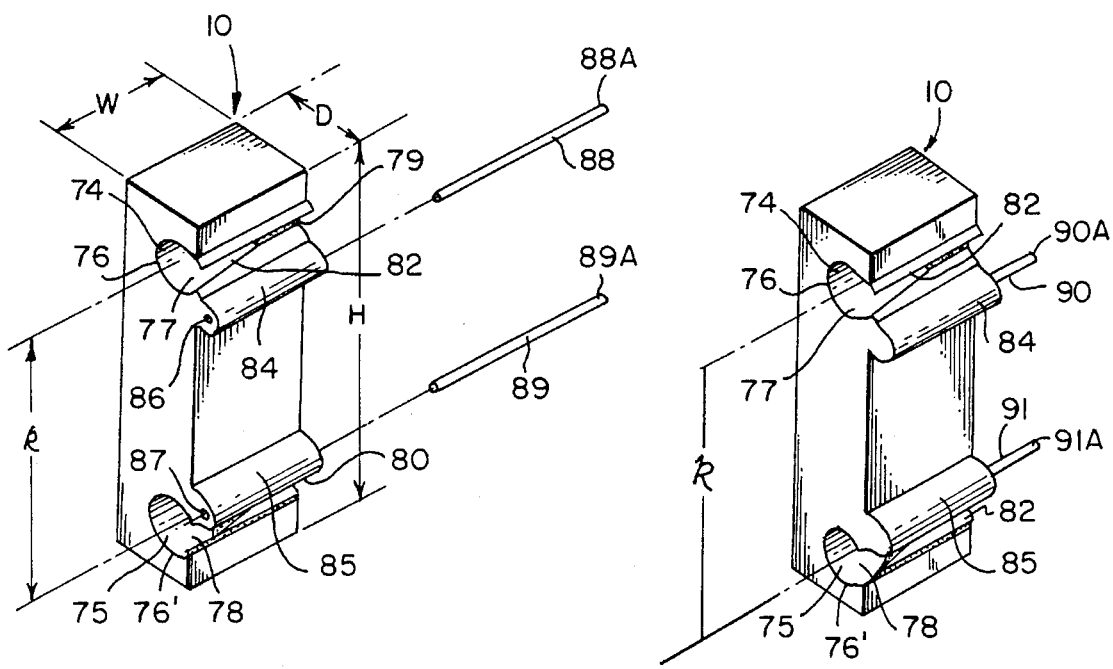
FIG. 6
FIG. 7

METHOD OF ASSEMBLING AN INFLATABLE CUSHION WITH A REACTION HOUSING IN AN INFLATABLE RESTRAINT SYSTEM

BACKGROUND OF THE INVENTION

1. Field of the Invention

The present invention relates to a method and device for coupling an inflatable cushion to a reaction housing in an inflatable restraint system. 2. Related Art In co-pending application Ser. No. 07/993,280, filed Dec. 18, 1992 by Lauritzen et al., now allowed U.S. Pat. No. 5,344,182 issued Sep. 6, 1994, which is owned by the assignee of the present invention, a system and method is disclosed for attaching an inflatable cushion to a reaction housing employed in an air bag module. The system employs a metal cushion retainer member as an interface between the gas inlet opening of an inflatable cushion and the reaction housing. Among other advantages, the retainer member serves as a structural brace or cross-tie for holding the walls of the reaction housing together. The cushion retainer member generally includes a pair of cylindrical channel portions that are separated by spacers (FIG. 4) into which a corresponding pair of thickened peripheral gas inlet openings of an inflatable cushion is inserted (FIG. 3). The thickened gas inlet opening is formed by providing a channel member, typically in the form of a hem, about the gas inlet opening of the cushion into which a bead material, such as a plastic rod, is inserted. Once formed, the thickened gas inlet opening, which is referred to herein as an "inflatable cushion insert" or simply "cushion insert" is placed into the respective channel portion of the cushion retainer.

The channel portion of the retainer member is typically in the form of a cylindrical sleeve having an elongate slot extending along its length to accommodate receipt of the hem or channel member of the inflatable cushion. Once the cushion insert is placed into the channel portion of the retainer, it is compressed about the flanged cushion insert in a crimping operation to form an attachment insert which is referred to hereinafter as a cushion retainer insert. The latter insert is then incorporated into an attachment sleeve of the reaction housing for the fastenerless attachment of the inflatable cushion thereto.

The use of a plastic rod in the hem of the gas inlet opening of the cushion facilitates the equal distribution of stresses on the cushion during its deployment. Unfortunately, during handling and assembly of the cushion insert into the inflatable restraint system, the rod has a tendency to fall out of its channel member or hem, thereby making the assembly process a sometimes awkward and cumbersome operation and necessitating the use of human intervention. Commonly owned copending application Ser. No. 08/289,868 filed concurrently with the present application on Aug. 12, 1994, now U.S. Pat. No. 5,454,588, addresses this situation by providing a means for retaining the rod in the channel member of the cushion in the form of a flange to provide what is termed as a flanged cushion insert.

Since the channel portion of the cushion retainer member is radially compressed about the flanged cushion insert, such as by a crimping operation, the compression is not always done in a uniform manner. For example, the compression can be overdone which will produce a smaller cross sectional area for the retainer insert and cause it to be loosely contained within the rigid attachment sleeve of the reaction housing member. A separate device or machine is therefore required to not only provide uniform securement of the cushion insert within the cushion retainer member, but also to align and couple the cushion retainer insert with the attachment sleeve of the reaction housing after the compression step. In order to improve the economics of the cushion insert assembly process, a method and device has now been provided whereby the alignment and securement of the retainer insert, or for that matter the cushion insert itself, with the reaction housing can be effected simultaneously. This is accomplished by placing the respective insert into an appropriately configured tool that provides for uniform compression of the channel portion of the retainer member about the insert, and at the same time aligns the resulting insert with the attachment sleeve of the reaction housing for automatically coupling the inflatable cushion with the reaction housing.

U.S. Pat. No. 3,304,602 issued to Osborne on Feb. 21, 1967 discloses a tool for clamping ferrules to cords of nonmetallic material. The tool is a pin and die arrangement wherein the die has a conical aperture of circular cross section whose sides slope downwardly and inwardly to a smaller circular cross section for axially and slidably receiving a pin therethrough. A guide is provided in the form of a cap mounted to the top of the die and having a cylindrically shaped opening for receiving the pin therethrough. Once the ferrule, whose width is greater than the small end of the aperture, is positioned about a cord and loosely seated into the conical aperture of the die, the top of the pin extending through the top of the cap is struck with a hammer to force the ferrule downwardly through the narrow opening of the aperture, thereby clamping the ferrule about the cord. However, the die of the tool would not be adaptable for the clamping of a cylindrically shaped sleeve of a cushion retainer member about a cushion insert since no elongate slot is provided in the die that would accommodate the passage of a cushion insert and accompanying inflatable cushion, through the die.

SUMMARY OF THE INVENTION

In accordance with the present invention, a method is provided for coupling an inflatable cushion with a reaction housing in an inflatable restraint system. The method comprises the steps of:

a) providing a die comprising (i) at least one cavity extending through the die; and (ii) an elongate slot communicating with the interior of the cavity and disposed along the length thereof to permit axial introduction and passage of an inflatable cushion insert through the cavity;

b) axially aligning the outlet of the cavity with the opening of a corresponding attachment sleeve provided in the reaction housing;

c) axially inserting an inflatable cushion insert into the cavity inlet of the die;

d) moving the cushion insert through the first and second cavity sections of the die; and e) moving the cushion insert into the corresponding attachment sleeve of the reaction housing thereby coupling the inflatable cushion with the reaction housing of the inflatable restraint system.

For the purposes of defining the invention herein, an inflatable cushion insert, in its simplest form, is defined as a channel member disposed about the gas inlet opening of an inflatable cushion with a bead or elongate strip contained therein. As indicated in the Background Of The Invention above, the cushion insert may also include a means for retaining the elongate strip within the channel member. When the strip is retained within the channel member by the disposition of at least one flange about the strip, the cushion insert is referred to as a flanged cushion insert.

The cavity of the die preferably includes an inlet opening communicating with a first section having inwardly tapered sides that terminate in a second section having a cylindrical configuration ending with an outlet, the inlet opening of the cavity being of a greater cross-sectional area than its outlet. The axial cross section of the second cavity section of the die relative to that of the mateable attachment sleeve is such that it will permit passage of the cushion insert from the cavity of the die into the attachment sleeve. Typically, the axial cross-sectional area of the cushion insert will be slightly less than that of the second cavity section as well as the attachment sleeve of the reaction housing. The proper sizing of the various cross sections of the individual members allows the cushion insert to be led into, and slidably received within, the mateable attachment sleeve with a slightly loose fit. However, to insure a positive and stationary fit of the insert within the attachment sleeve of the reaction housing, either a flanged cushion insert or cushion retainer insert is used for coupling the inflatable cushion with the reaction housing.

According to one aspect of the invention, when the cushion insert is in the form of a flanged cushion insert, the axial cross section of the insert, including the flange(s), will be greater than that of the second cavity section of the die, but less than the cavity inlet, to permit a uniform compression of the flange(s) when the insert is passed through the cavity of the die. This allows a uniform alignment and securement of the insert within the attachment sleeve of the reaction housing.

The axial introduction of the cushion insert into the cavity inlet of the die, and/or it's movement through the die, may be accomplished manually, or mechanically by the use of appropriate machinery. Movement of the cushion insert into the attachment sleeve of the reaction housing may be accomplished in the same manner.

Another aspect of the invention includes, either as an additional step for coupling the inflatable cushion to a reaction housing, or as a method by itself, placing the cushion insert, preferably in the form of a flanged cushion insert, into a channel portion of a cushion retainer member to form a cushion retainer insert whose axial cross-sectional area is greater than that of the die cavity. Specifically, the axial cross-sectional area of the cushion retainer insert is greater than the second cavity section of the die, but less than the cavity inlet opening.

As noted hereinbefore, the channel portion of the cushion retainer member is typically in the form of a sleeve, preferably of a cylindrical configuration, that includes an elongate slot communicating with the interior of the sleeve and extending along the length thereof. As an optional step in the method according to the invention, the channel portion may be partially compressed about the cushion insert to maintain the insert's position therein before the resulting cushion retainer insert is introduced to the die opening. After the cushion retainer insert is formed and passed through the cavity of the die into the attachment sleeve of the reaction housing, a uniform compression and securement of the channel portion about the cushion insert is obtained, simultaneously with its coupling within the attachment sleeve of the reaction housing. Like the channel portion of the retainer member, the attachment sleeve of the reaction housing is provided with an elongate slot communicating with the interior of the sleeve and disposed along the length thereof. This permits the cushion insert to be axially received in the channel of the mateable attachment sleeve for coupling the cushion with the reaction housing.

An assembly device is provided for practicing the method in accordance with the invention. The device permits the alignment and coupling of an inflatable cushion insert formed at the gas inlet opening of an inflatable cushion, with a corresponding attachment sleeve of a reaction housing in an inflatable restraint system. In addition to the description for the die stated above, the assembly device may further include a means for axially aligning the cavity of the die with the attachment sleeve of the reaction housing. The means may be provided by fixing the die and reaction housing to a common fixture. The means for aligning the die cavity with the attachment sleeve may also be provided by a means for mounting the die to the reaction housing such that the attachment sleeve and cavity are axially aligned to permit introduction of the cushion insert into the attachment sleeve for coupling the inflatable cushion with the reaction housing. In one embodiment of the invention, the means for mounting the die to the reaction housing includes at least two openings provided in the die for the insertion therein of a corresponding number of alignment dowels mateable with corresponding openings provided within the reaction housing. In another embodiment, the means for mounting the die to the reaction housing may include at least two protrusions provided on the die that are mateable with corresponding openings provided in the reaction housing.

In yet another embodiment of the invention, the die may be comprised of a plurality of cavities, preferably a pair, to facilitate the axial passage of a corresponding number of cushion inserts therethrough. When a pair or plurality of cavities are employed in the die, the cavities are spaced apart from each other in a substantially parallel relationship. Accordingly, the method of the invention may include the placement of a pair of cushion inserts of the inflatable cushion, preferably in the form of flanged cushion inserts, into corresponding channel portions of a retainer member. The resulting cushion retainer inserts are then passed through the respective cavities of the die thereby uniformly securing the channel portions of the retainer member about the cushion inserts. Simultaneously, the cushion inserts and retainer channel portions are appropriately aligned with their associated attachment sleeves in the reaction housing for insertion therein.

In order to accommodate the passage of the retainer member channel portions or flanges of the flanged cushion insert through the cavity of the die into the reaction housing, a lubricant, such as a paraffin-based wax, may be used to coat the outside area of the retainer member sleeve and/or the bore of the cavity.

BRIEF DESCRIPTION OF THE DRAWINGS

A complete understanding of the present invention may be obtained by reference to the following specification when taken in conjunction with the accompanying drawings wherein certain preferred embodiments are illustrated and wherein like numerals refer to like parts throughout. Thus.

FIG. 5 is a perspective view of a fully coupled cushion retainer member with a reaction housing omitting the inflatable cushion shown in FIGS. 1 and 2 for purposes of clarity.

FIG. 6 is a perspective view of the die shown in FIGS. 3 and 4 illustrating an embodiment for mounting the die to the reaction housing.

FIG. 7 is a perspective view of the die shown in FIG. 6 illustrating another embodiment in accordance with the invention for mounting the die to the reaction housing shown in FIG. 3.

DETAILED DESCRIPTION OF THE INVENTION AND PREFERRED EMBODIMENTS THEREOF

The present invention provides an improved method and device for assembling and coupling an inflatable cushion (hereinafter referred to as a "cushion") with a reaction housing of an inflatable restraint system. As will be seen from the accompanying drawings, particularly FIGS. 1–7, the method employs a die 10 for aiding in the joining of a cushion 12 with a cushion retainer member 14 for coupling the cushion with a reaction housing 16.

Figure 1:
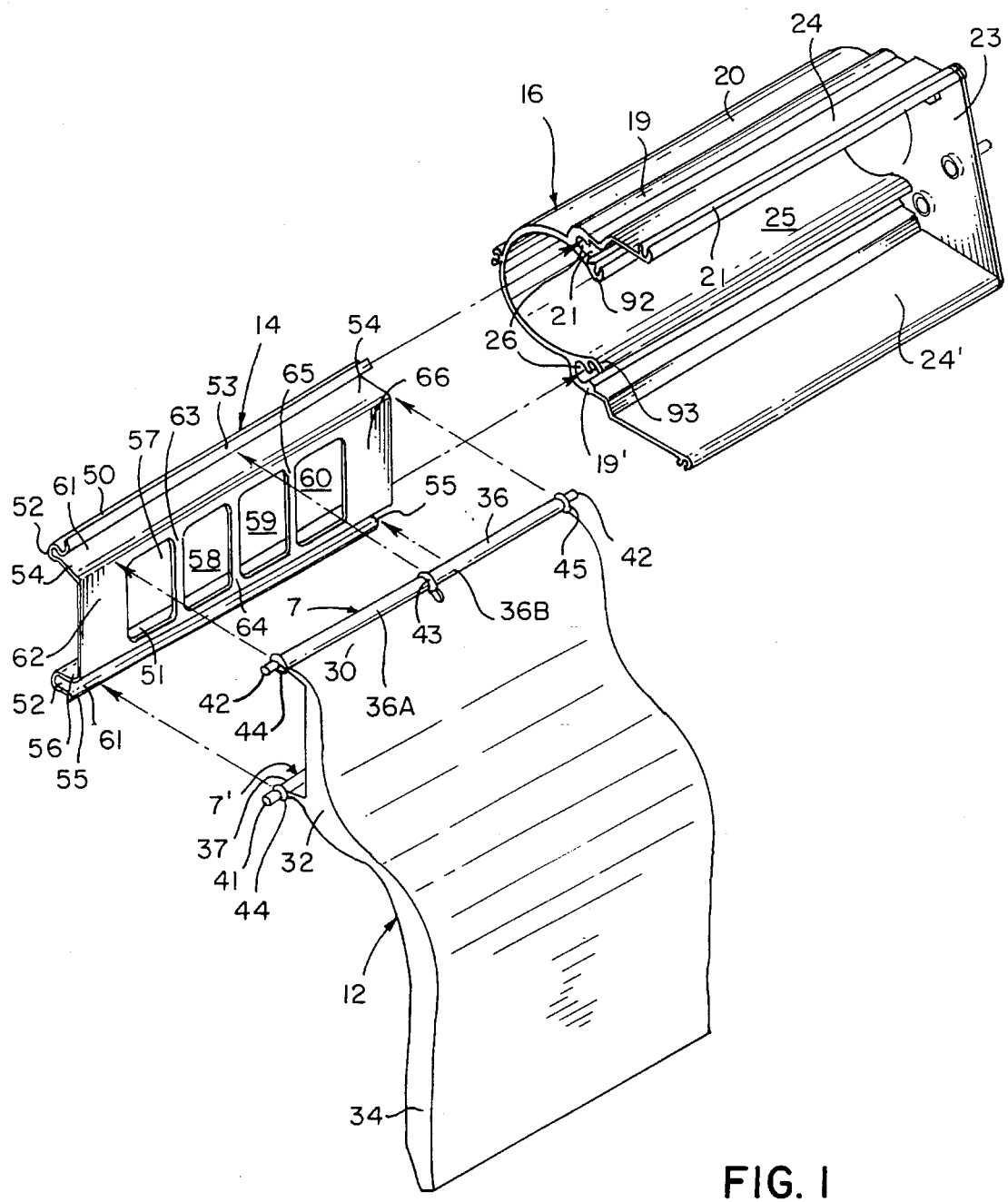
FIGS. 1 through 3 illustrate an exploded perspective view of a sequence whereby an inflatable cushion, cushion retainer member and reaction housing are coupled together with the aid of a die in accordance with one embodiment of the invention.

Referring specifically to FIG. 1, the cushion 12, which is shown in an extended deflated condition, is comprised of three sections which include a gas inlet opening 30, a throat section 32, and a pillow section 34. The gas inlet opening 30 defines that area of the cushion, as the name implies, for admitting gas from an inflator (not shown) through an opening (not shown) into the throat section 32, followed by its entry into pillow section 34 which serves to inflate the cushion and protect a person from serious injury during a sudden deceleration of the vehicle, for example, during a collision. The inflator does not form a part of the invention herein, and will therefore not be further described.

Figure 11:
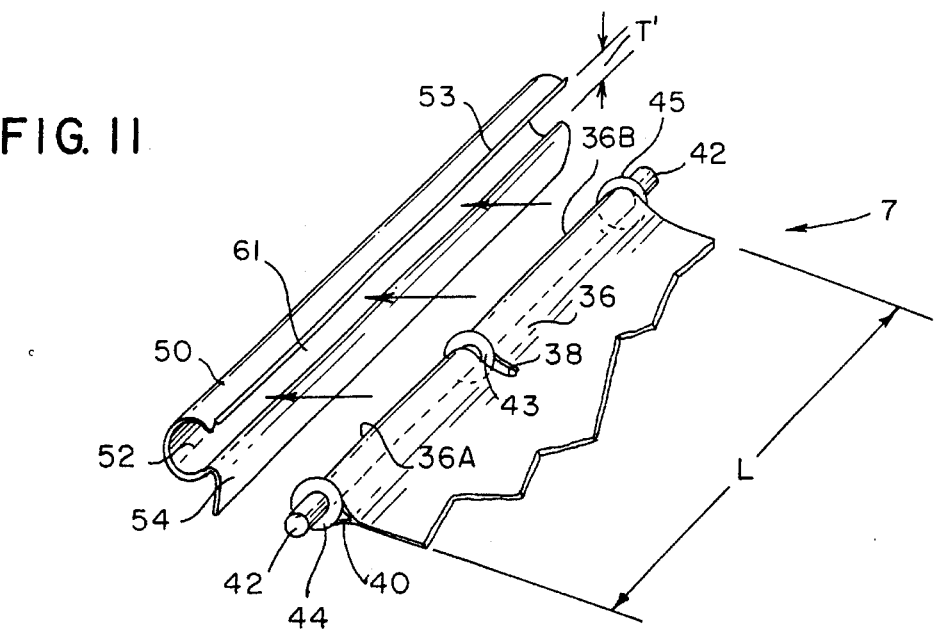
FIG. 11 is an exploded fragmentary perspective view of the flanged cushion insert shown in FIG. 1 illustrating on an enlarged scale the manner of its introduction into the channel portion of the cushion retainer member shown in FIGS. 1 through 2.

Referring now to FIG. 11, a flanged cushion insert 7 is illustrated in which gas inlet opening 30 of cushion 12 is provided with a channel member 36 in the form of a hem at the periphery of the gas inlet opening 30. A channel 40 is formed in the hem by overlapping the cushion material and attaching both pieces of the material that is formed, by sewing a stitch (not shown). While channel member 36 is integrally formed with the gas inlet opening of cushion 12, it is possible to separately fabricate the channel member from any suitable material and attach it to the cushion by conventional means, for example, by sewing. As illustrated in FIG. 1, a pair of channel members 36 and 37 are provided at the gas inlet opening 30 of cushion 12 such that each channel member is spaced apart from one another in substantially parallel relationship.

Referring once again to FIG. 11, a means for retaining rod 42 in channel 40 of channel member 36 is illustrated wherein rod 42 has a central flange 43 and end flanges 44 and 45 secured thereto. End flanges 44 and 45 are secured proximate to the end of rod 42. Rod 42 and flanges 43, 44 and 45 are mold injected into a one piece construction from a suitable plastic material, although the rod and flanges can take any shape in the form of a flanged strip. The rod and flanges can be fabricated from any suitable material such as plastic or metal stock, and fixed to each other by conventional means. Rod 42 extends slightly beyond the confines of channel member 36 and is retained in channel 40 by the admittance of central flange 43 into a slotted opening 38 provided in the material of the channel member. The introduction of central flange 43 into opening 38 divides the channel member into two sections, 36A and 36B. End flanges 44 and 45 are spaced apart from central flange 43 so as to dispose and contain channel member section 36A between flanges 43 and 44, and channel member section 36B between flanges 43 and 45.

Depending on the length dimension of channel member 36 (as well as channel member 37 shown in FIG. 1), which is represented by the letter "L" in FIG. 11, rod 42 is provided with at least one flange or a plurality of flanges, for example, two or three, for engagement with a corresponding number of slotted openings in channel member 36 to divide the channel member into corresponding sections. Each section will be disposed between their respective flanges in the same manner described for sections 36A and 36B. The increased number of flanges not only strengthens the retention of rod 42 in channel 40, but also provides added securement of cushion 12 to its associated member, i.e., reaction housing 16 or cushion retainer member 14.

Figure 12:
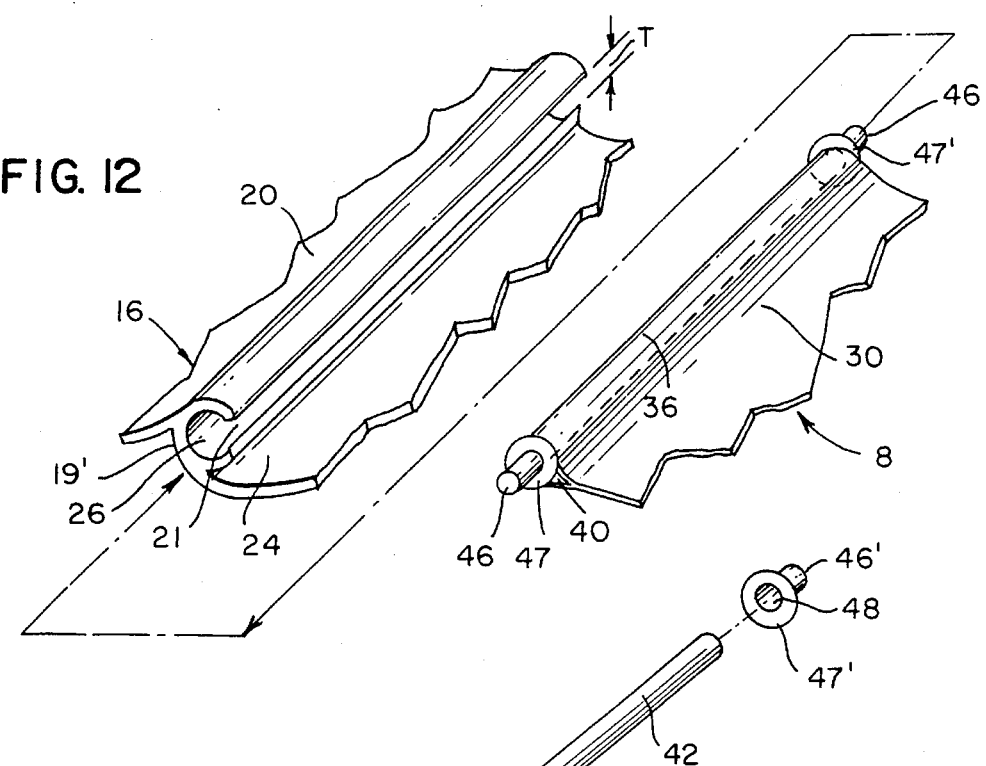
FIG. 12 is an exploded fragmentary perspective view of the flanged cushion insert shown in FIGS. 8 and 9 illustrating on an enlarged scale the manner of its introduction into the attachment sleeve of the reaction housing shown in FIGS. 8 through 10.
Figure 13:
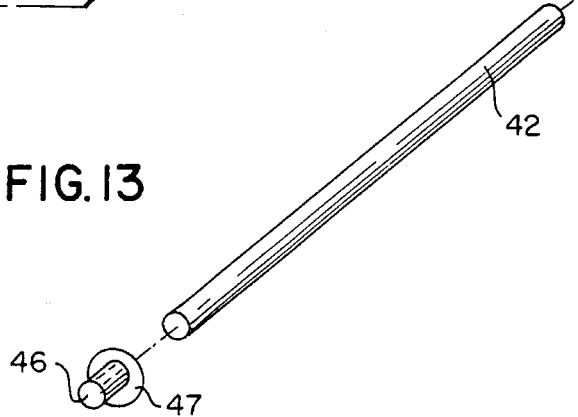
FIG. 13 is an enlarged perspective view of the elongate strip and flanged caps illustrated in FIG. 12.

As an alternative for the flanged cushion insert 7, particularly when the length L of channel members 36 and 37 is relatively short, the flanges may be disposed about rod 42 in the form of flanged caps 46 and 46' mounted to the ends of the rod without a central or intervening number of flanges disposed about the rod (see FIGS. 12 and 13). Caps 46 and 46' have flanges 47 and 47' affixed thereto, respectively. Once rod 42 is inserted into channel 40 and the flanged caps are mounted to each end of the rod, the channel member 36 will be contained between flanges 47 and 47'. To insure the retention of the channel member between the flanged caps 46 and 46', the cross-sectional area of flanges 47 and 47' are slightly larger than the channel 40 of channel member 36. The retention of flanged cap 46 on the end of rod 42 is insured by having the opening 48 in each of the caps form an interference fit with the end of rod 42. As an alternative, the caps may be fixed to the rod by any suitable means such as by adhesive bonding. The flanged caps may be of any construction or material that will provide securement and compatibility with rod 42, such as a mold injectable thermoplastic material. Accordingly, the insert may take the form of the flanged cushion insert shown in FIGS. 8, 9 and 12 and denominated by the number 8. Flanged caps 46 and 46' may be substituted for end flanges 44 and 45, respectively, of flanged cushion insert 7 shown in FIG. 11 to accomplish the same task, i.e., to retain the disposition of channel member 36 between flanges 47 and 47'.

It will be appreciated that the physical size of the flanges (43, 44, 45, 47 and 47') is slightly larger than the cross-sectional area of channel 40. This permits channel member 36 to be disposed and retained between the flanges located about the ends of rod 42. It also permits central flange 43 of cushion insert 7 (as well as the end flanges) to be slidably received in channel 40, preferably with a slight interference fit, and prevents the flange from becoming "unbuttoned" from slotted opening 38 with which it is engaged. In this manner, rod 42 is retained in channel member 36.

The flanges disposed about rod 42 may be of a substantially deformable consistency, i.e., the flanges may be characterized in that they undergo a substantially permanent alteration in shape when it is subjected to an external force, such as, for example, a compressive force used in a crimping operation. In other words, the flange does not have the capability of returning to its original shape when the external force is removed. Alternatively, the flanges can be of a resilient consistency and sized for slidable insertion into their associated members, preferably with a slight interference fit. By "resilient consistency" is meant a temporary alteration in shape of the flange when it is subjected to an external force with the capability of substantially returning to its original shape when the external force is removed. In this way, the resilient nature of the flange will impart the desired retention of the channel members 36 and 37 within its intended receptacle. The determining factor for imparting a desired characteristic to the flange will depend to a large extent on the nature of the receptacle into which the flanges are inserted, and the means by which the flanges are retained therein, which is described in greater detail below.

As noted in the Summary Of The Invention, channel member 36 of inflatable cushion 12, plastic rod 42, and the various flanges disposed about rod 42, when combined and assembled together, form a flanged cushion insert which is identified by numeral 7 in FIG. 11 and numeral 8 in FIG. 12. The flanged cushion insert, including the entire cushion 12, is an assembly that can be easily handled and transported without the displacement or loss of rod 42. The assembly provides for the fastenerless attachment of the cushion to reaction housing 16 by the added use of flanges, effectively eliminating the need for direct contact with the cushion during the assembly process for implementing its coupling to the reaction housing.

Referring to FIG. 1, cushion retainer member 14 includes a first channel portion 50 and a second channel portion 51, both in the form of a slotted cylindrical sleeve. Channel portions 50 and 51 are substantially parallel to each other and joined by spacer members 62, 63, 64, 65 and 66 to define four substantially rectangular diffuser openings 57, 58, 59 and 60 to permit the flow of gas therethrough into cushion 12 when the inflator (not shown) is activated. The cylindrical configuration of each channel portion 50 and 51 defines a channel passage 52. Each channel portion is provided with an elongate slot 61 communicating with passage 52 and extending over the length thereof, slot 61 being further defined by extended side walls 53 and 54 for first channel portion 50, and extended sidewalls 55 and 56 for second channel portion 51. Spacer members 62, 63, 64, 65 and 66 communicate with sidewalls 54 and 56 for bridging the first and second channel portions.

Cushion retainer member 14 is typically of a ductile sheet metal construction, preferably steel or aluminum, although any material and construction can be used that will withstand the forces encountered under operating conditions, viz., when the inflator (not shown) is activated and cushion 12 deployed.

Reaction housing 16, which is fabricated by the extrusion processing of aluminum, has a generally cylindrical construction for defining a housing section 20 that encloses a cavity 25 to secure a compatibly configured inflator (not shown) therein. A rigid attachment sleeve, 19 and 19', resembling the shape of a narrow hollow cylinder and defining a cylindrically shaped opening 26, is integrally formed on each side of reaction housing 16. Each attachment sleeve 19 and 19' is provided with an elongate slot 21 communicating with opening 26 and facing in the general direction of cushion 12 (see FIGS. 1 and 2). It is understood that attachment sleeves 19 and 19' can be separately made and joined to reaction housing 16 by any conventional means such as, for example, by welding. A side wall 24 is provided on each side of the reaction housing appurtenant to attachment sleeve 19 for supporting and containing throat section 32 of cushion 12. Housing section 20, side walls 24 and attachment sleeves 19, 19' terminate in an end wall 23 which serves as a partial containment of the inflator (not shown) and cushion 12 within reaction housing 16 at one end thereof.

Figure 4:
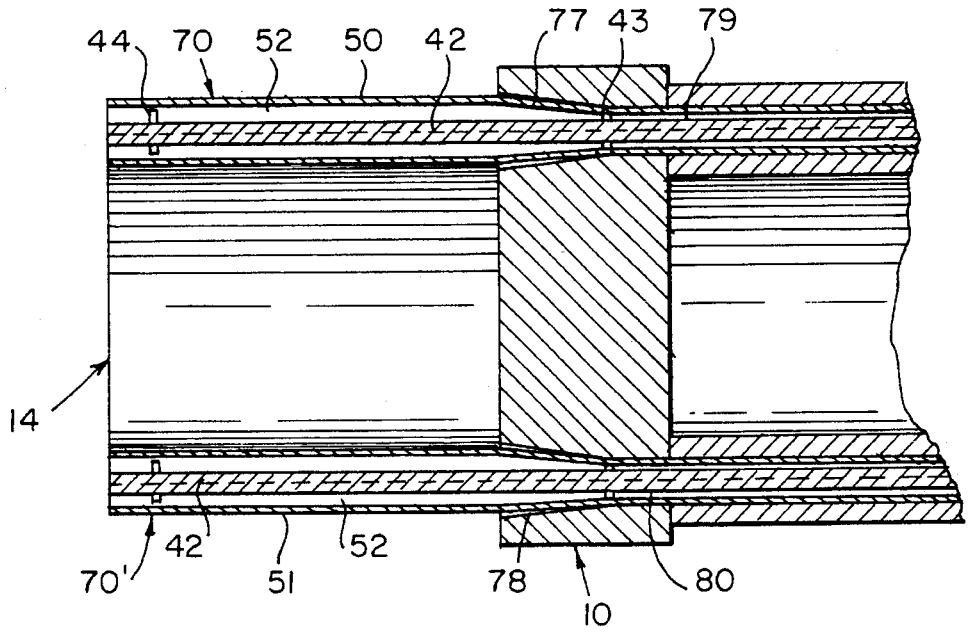
FIG. 4 is an elevated cross-sectional view of a portion of the partially coupled apparatus and die shown in FIG. 3 taken along the line A—A.
Figure 8:
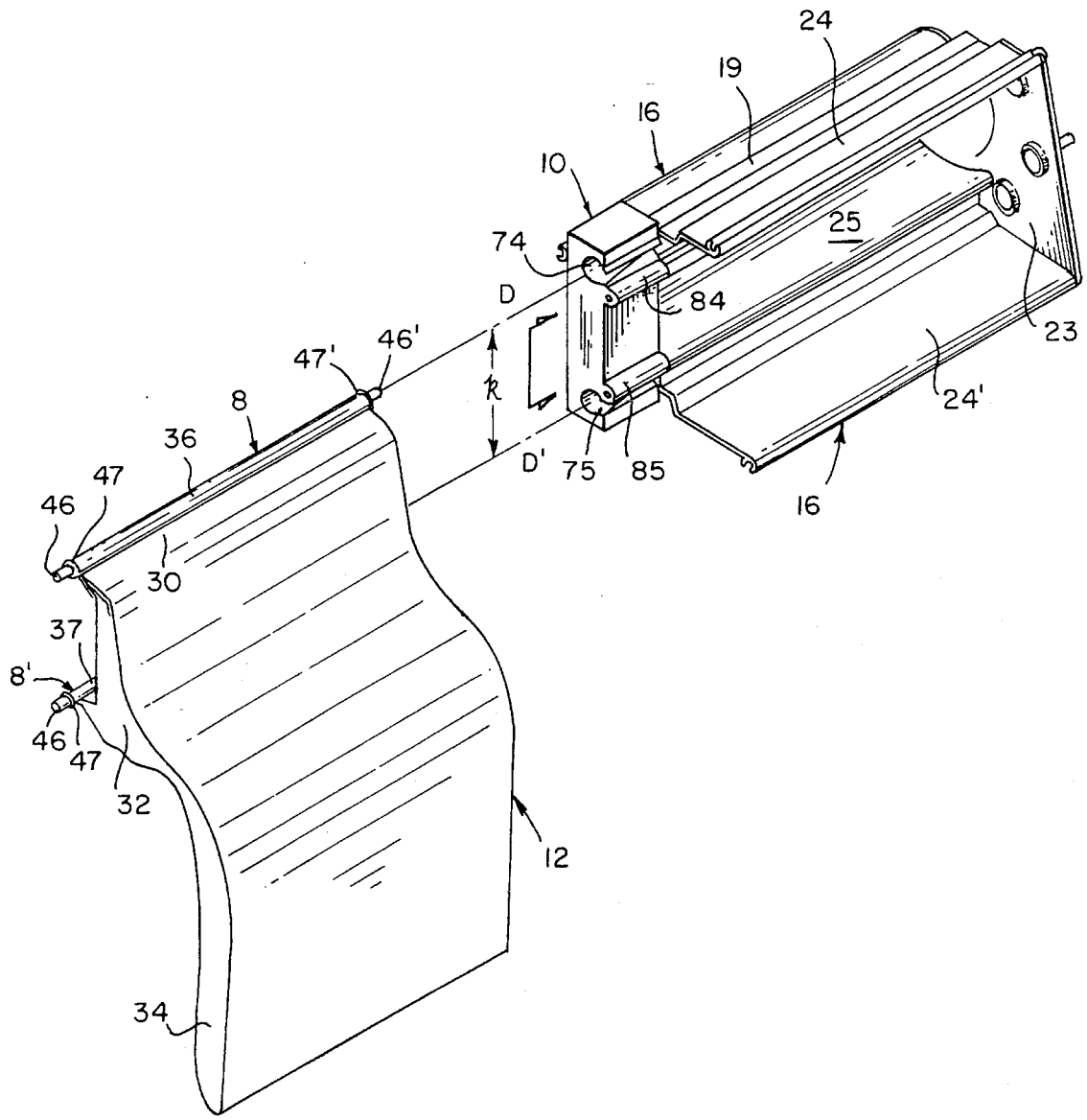
FIGS. 8 through 10 illustrate an exploded perspective view of a sequence whereby an inflatable cushion and a flanged cushion insert are coupled with a reaction housing with the aid of a die in accordance with another embodiment of the invention.

An assembly tool in the form of a die 10 for aiding in the coupling of flanged cushion insert 7, cushion 12 and cushion retainer member 14 with reaction housing 16, is illustrated in FIGS. 4, 6 and 7. Referring specifically to FIGS. 6 and 7, die 10 is of a solid block construction, preferably made of steel, having a generally rectangular configuration defining a width W, height H and depth D. Two cavities 74 and 75 are provided in the die both of which extend through the width thereof. Each cavity is substantially parallel to each other and spaced apart by the distance k shown in FIG. 6. Distance k is measured from the central axis of each of the cavities 74 and 75 and corresponds to the distance between first and second channel portions 50 and 51 (FIG. 2), and between attachment sleeves 19 and 19' (FIG. 8).

Cavities 74 and 75 are provided with an elongate slot 82 extending over their length, and communicating with the cavity interior. The elongate slot in the cavities permits the reception and passage of flanged cushion insert 7 through die 10 into reaction housing 16. Each of the slots therefore corresponds to elongate slot means for permitting the cushion throat to extend from the cavity means. Cavities 74 and 75 have a generally circular inlet opening 76 and 76', respectively, communicating with a first cavity section, 77 and 78, in the shape of a frustum of a cone which is best illustrated in FIG. 4. First cavity section 77, 78 communicates with a second cavity section 79, 80, respectively, which has a straight cylindrical configuration.

Die 10 is provided with a pair of bosses 84 and 85 having respective openings 86 and 87 for the insertion of corresponding alignment dowels 88 and 89 to mount the die to reaction housing 16. A taper 88A and 89A is provided at the end of dowels 88 and 89, respectively, to facilitate the dowels' insertion into mounting channels 92 and 93 of the reaction housing. Alignment dowels 88 and 89 may take any form to insure the attachment of the die with the reaction housing during the cushion assembly process, such as, for example, machine screws or straight rods that are manually inserted into the associated members. As an alternative embodiment for mounting die 10 to reaction housing 16, which is illustrated in FIG. 7, bosses 84 and 85 may be provided with protrusions 90 and 91, respectively, which are configured to be mateable with corresponding mounting channels 92 and 93 contained in reaction housing 16, as shown in FIGS. 1, 2, 5 and 10. Like dowels 88 and 89, a taper 90A and 91A is provided at the end of respective protrusions 90 and 91 to facilitate their engagement with the corresponding mounting channels. It will be understood that die 10 and reaction housing 16 can be aligned with each other without the use of the foregoing mounting means by securing the two members to a common fixture (not shown), e.g., a platform, such that cavities 74 and 75 are properly aligned with attachment sleeves 19 and 19', respectively, for the passage of the cushion insert and/or cushion retainer member therethrough.

The foregoing apparatus and elements makes possible the assembly of a cushion insert and cushion retainer member with a reaction housing for incorporation into an inflatable restraint systems such that the securement of the cushion insert within the retainer member is effected simultaneously with the retainer's alignment and coupling to the reaction housing. The method according to the invention and the use of the die will become more apparent from the following description of the preferred embodiments with the aid of the attached drawings.

Referring to FIGS. 1 and 11, a pair of flanged cushion inserts 7 and 7' positioned about the gas inlet openings 30 of cushion 12 is placed into the first and second channel portions 50 and 51, respectively, of cushion retainer member 14. This is accomplished by forcing flanges 43, 44 and 45 of inserts 7 and 7', which are of a deformable consistency, in a perpendicular direction into elongate slot 61 of channel portions 50 and 51 (see FIG. 11). Channel portions 50 and 51 have a slightly resilient quality for receiving flanges 43, 44 and 45 therein, the flanges being sized larger than the thickness T' of elongate slot 61 to provide for a snap fit between sidewalls 53 and 54, and 55 and 56, of channel portions 50 and 51, respectively. The larger flange size not only aids in the positive positioning of inserts 7 and 7' during their placement into channel passage 52, but also helps to align the inserts within cushion retainer member 14.

Figure 2:
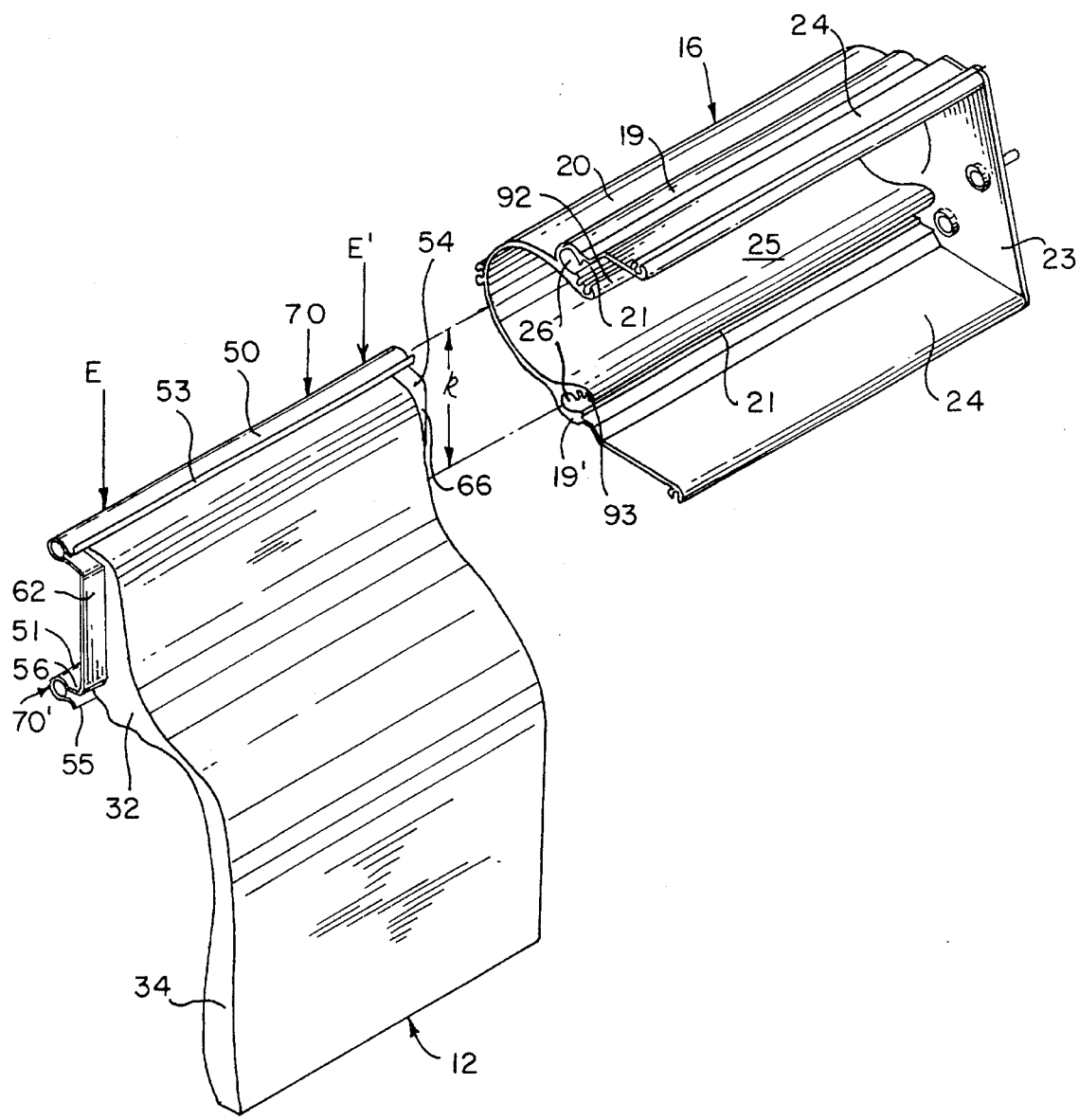

As illustrated in FIG. 2, after being fully inserted into channel passages 52, a portion of channel member sections 36A and 36B (FIGS. 1 and 11), as well as gas inlet openings 30, will extend through elongate slot 61 of channel portions 50 and 51 in a substantially perpendicular relationship thereto. In accordance with one embodiment of the method according to the invention herein, channel portions 50 and 51 may be optionally compressed in a crimping operation about deformable flanges 43, 44 and 45 of flanged cushion inserts 7 and 7' (indicated by the downwardly pointing arrows E, E' shown in FIG. 2) to initially position and contain the inserts therein. The crimping operation may be done manually or automatically by mechanical means using appropriate machinery (not shown). This step is helpful if the size of the flanges is less than the opening of passage 52. The result is that the thickness T' of elongate slots 61 (FIG. 11) will be reduced to a size that is less than the diameter of rod 42. The optional compression step facilitates the handling of the cushion retainer insert during its coupling with the cushion retainer member 14 and introduction to die 10 by preventing the inserts from falling out of the axial ends of channel passages 52. If need be, the compression of channel portions 50 and 51 about their respective flanged cushion inserts 7 and 7' can be facilitated by the provision of bend lines (not shown) along the channel portion's internal length. It is to be noted that during the handling and positioning of the cushion inserts, contact with the material of channel members 36 and 37 by first and second channel portions 50 and 51, as well as cushion retainer member 14, is substantially reduced since flanges 43, 44 and 45, and not the inflatable cushion, are used for positioning inserts 7 and 7' within the retainer member.

Figure 3:
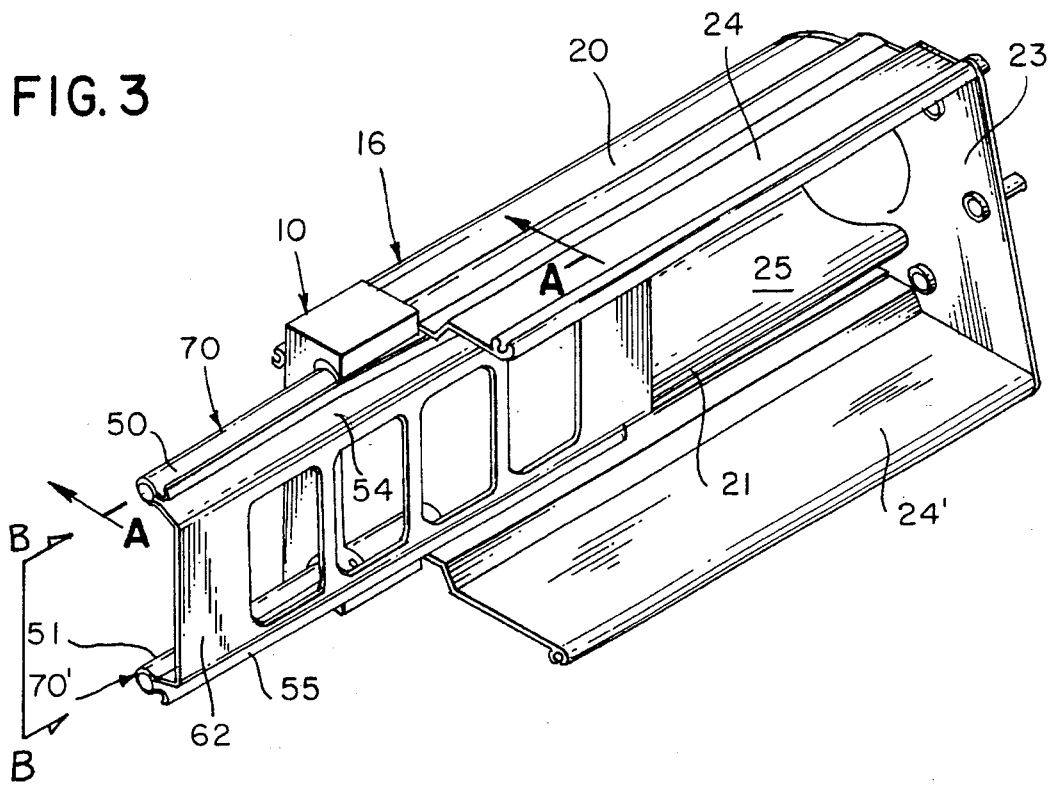

The coupling of each cushion insert 7 and 7' with its channel portion counterpart (50 and 51, respectively) forms cushion retainer inserts 70 and 70' (FIGS. 3 and 4) that are sized and configured to be slightly larger than the cross-sectional area of opening 26 in attachment sleeves 19 and 19' of reaction housing 16. Die 10 is provided whose second cavity sections 79, 80 are aligned with openings 26 in attachment sleeves 19, 19' by mounting the die directly to reaction housing 16 as shown in FIG. 3. This is accomplished in FIG. 3 by the insertion of alignment dowels 88, 89 (shown in FIG. 6) through bosses 84, 85, respectively, of die 10, into corresponding mounting channels 92, 93 of reaction housing 16. As noted above, die 10 and reaction housing 16 may be aligned with each other by their securement to a common fixture, such as a platform.

In order to secure cushion retainer inserts 70 and 70' within the corresponding channel portions of the housing 16, the inserts are introduced into the first cavity sections 77, 78 of die 10 (see FIGS. 3 and 4). The conical configuration of the first cavity sections provides guidance for leading the retainer inserts into and through the die. After their insertion, the retainer inserts are moved in the direction of arrows B—B through the die and into the corresponding attachment sleeves 19, 19' of reaction housing 16. The narrowed openings of the exit of the first cavity sections, as well as the second cavity sections 79, 80, will cause channel portions 50, 51 to be automatically compressed about flanged cushion inserts 7, 7', thereby providing a uniform securement of each flanged insert within its corresponding channel portion. Since the narrowest point of the first cavity section is a load bearing surface due to the forces exerted on it by the passage of the cushion retainer insert therethrough, the straight cylindrical configuration of the second cavity sections 79, 80 obviates what would otherwise be a load bearing edge, by offering a greater surface area to be contacted by the passing flanges and retainer insert. The provision of a larger surface area relieves the stresses exerted at the exit of the conical second cavity section that would ordinarily cause excessive wear in this area of the die.

By including die 10 in the assembly process, an overcrimping of the insert is prevented which would otherwise cause a loose fit to occur within the attachment sleeve. This would result in a "rattling" condition that would cause an unwelcome noise in the vehicle employing the inflatable restraint system. In addition, die 10 acts as an alignment tool for coupling cushion retainer member 14 with its associated retainer inserts 70, 70' to reaction housing 16 It will be readily apparent that alignment of the retainer inserts with the reaction housing does not have to be precise since the die compensates for this by providing an accurate and precise correlation between these members for effecting final alignment.

The axial introduction of a cushion insert, such as the flanged cushion inserts 7 and 8 illustrated in FIGS. 11 and 12, respectively, or a cushion retainer insert, e.g., inserts 70 and 70' illustrated in FIGS. 2 and 3, into the cavity inlet opening 76, 76' of die 10 may be accomplished manually, or by mechanical means such as by the use of appropriate machinery. Movement of the cushion insert or cushion retainer insert through die 10 and into the attachment sleeves 19, 19' of reaction housing 16 may also be accomplished in the same manner, i.e., manually or mechanically.

As indicated above, the cross-sectional sizing of second cavity sections 79, 80 is such that compressed retainer inserts 70, 70' will be slidably received within attachment sleeves 19, 19', preferably with a slightly loose fit. Once the retainer inserts are fully introduced into channel passages 52 of attachment sleeves 19, 19', a slight interference fit is provided by the resilient quality of the channel portions 50, 51 such that a slight radial expansion within channel passage 52 takes place after the inserts leave the second cavity sections of die 10. The interference fit prevents the retainer inserts from "rattling" in channel passages 52 of attachment sleeves 19, 19'. A completed assembly is illustrated in FIG. 5 which omits cushion 12 for purposes of clarity.

It will be appreciated that die 10 can be used as an assembly tool, by itself, for securing a cushion insert within a retainer member to facilitate the coupling of cushion 12 with reaction housing 16. In this case, die 10 need not be mounted or aligned with the attachment sleeves of reaction housing 16. The procedure for securing the cushion insert within the channel portions of a cushion retainer member will be the same as that illustrated in FIGS. 1 through 3 absent the mounting of die 10 to reaction housing 16.

Figure 9:
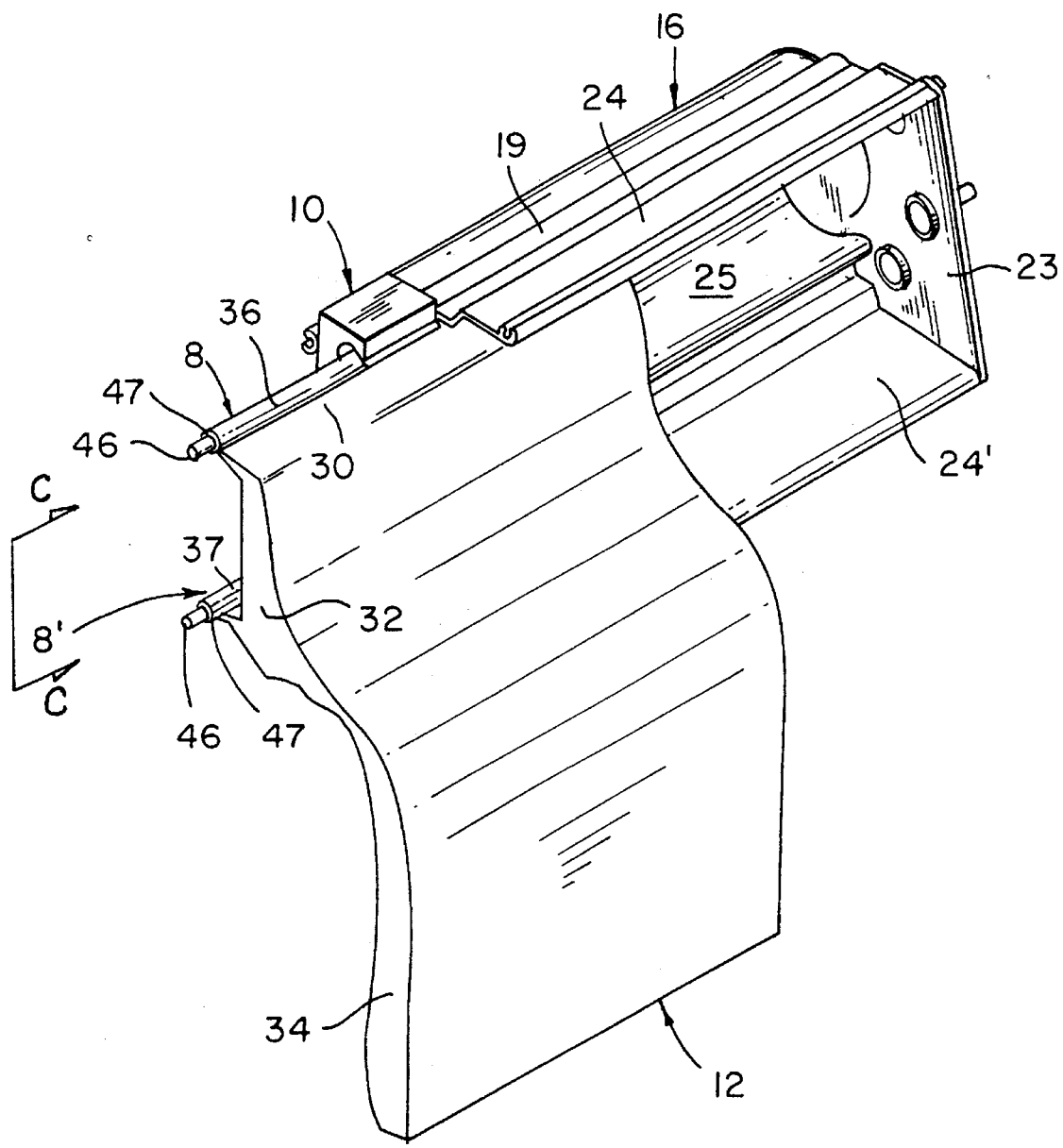
Figure 10:
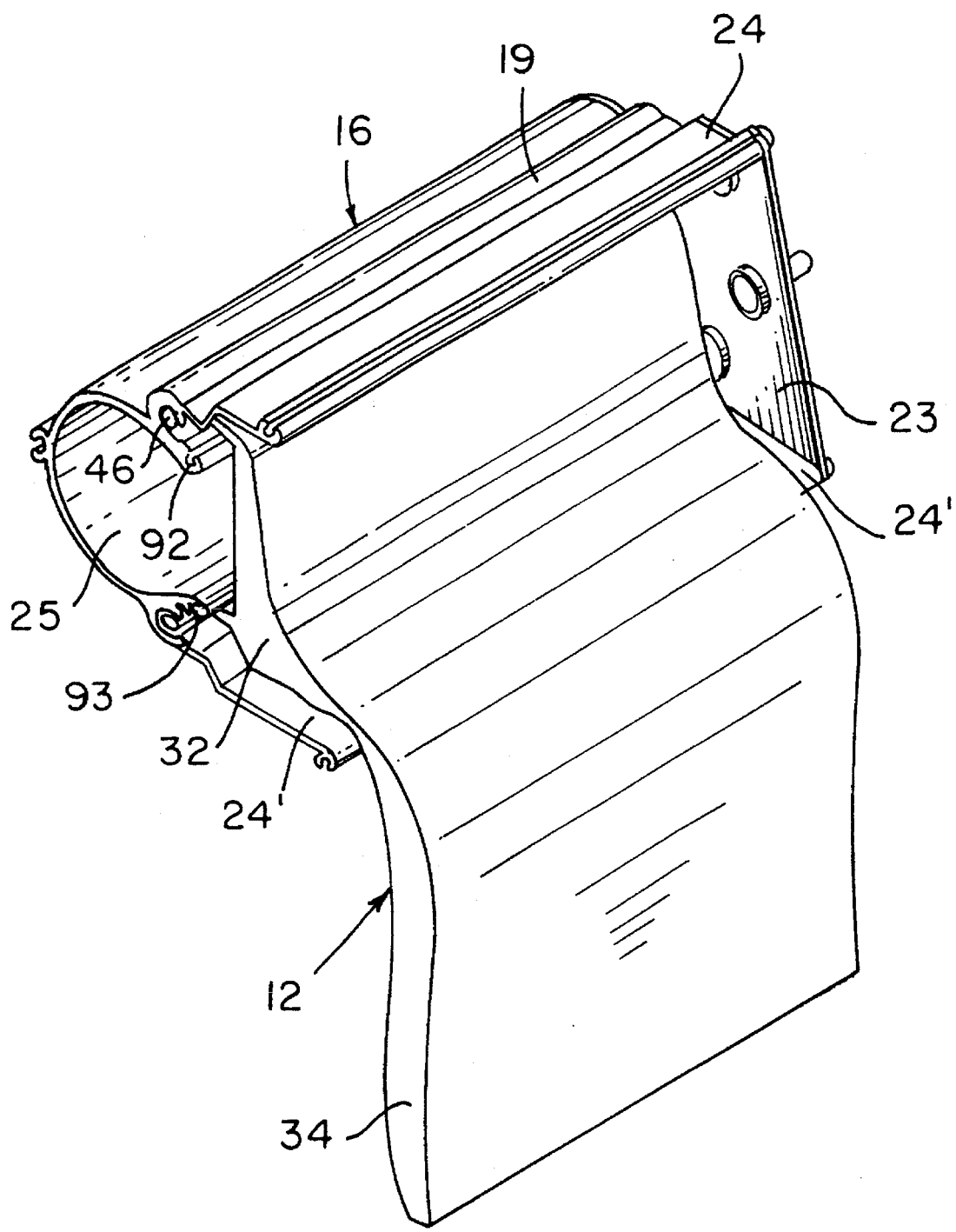

According to another embodiment of the invention, a flanged cushion insert may be coupled with the attachment sleeve of the reaction housing without the use of a cushion retainer member. Referring to FIGS. 8 through 10, flanged cushion inserts 8 and 8', whose details are illustrated in FIG. 12, are guided in the direction of arrows D, D' and axially introduced into first cavity sections 77 and 78, respectively, of die 10, the die being mounted to reaction housing 16 in the same manner illustrated in FIGS. 3, 4 and 6. Flanges 47 and 47' are part of flanged caps 46 and 46', respectively, which are mounted to the ends of rod 42 for retaining channel members 36 and 37 therebetween. The flanges of inserts 8 and 8' are of a resilient consistency and sized slightly larger than the cross-sectional areas of second cavity sections 79, 80 and cylindrically shaped opening 26 of attachment sleeves 19, 19', to provide for a slidable interference fit therein. Elongate slot 21 of attachment sleeves 19 and 19' has a thickness T (see FIG. 12) that is less than the diameter of rod 42 to prevent cushion inserts 8 and 8' from slipping therethrough when the forces of gas emanating from the gas inflator (not shown) are exerted within cushion 12.

As shown in FIG. 9, die 10 serves as a lead-in tool for aligning and guiding the flanged cushion inserts into reaction housing 16. The inserts are moved through the die in the direction of arrows C—C into attachment sleeves 19 and 19'. During the insertion process, contact with the material of channel member 36 by the attachment sleeves 19, 19' is substantially reduced since flanges 47 and 47' are used as the coupling vehicle. In this case, retention of the cushion insert in opening 26 of attachment sleeves 19, 19' is achieved by the resilient nature of the respective flanges. A completed assembly of cushion 12 and flanged cushion inserts 8 and 8', with reaction housing 16 is illustrated in FIG. 10.

It is to be understood that die 10 can be used to align and couple a cushion insert in its simplest form, i.e., without the inclusion of flanges disposed about rod 42 for retaining the rod within channel members 36 and/or 37, with the reaction housing. Such an insert, as defined under the Summary Of The Invention heading, can be placed into first and second channel portions 50 and 51 of cushion retainer member 14 to form respective cushion retainer inserts that are then introduced into die 10 in the same manner as cushion retainer inserts 70 and 70' in FIG. 2. Securing the inserts within their respective channel portions and coupling them with reaction housing 16 is accomplished by moving the so-formed retainer inserts through die 10 in the same manner illustrated in FIG. 3.

Die 10 can also be used as an alignment and lead-in tool for assembling the cushion insert directly to reaction housing 16 without the inclusion of the cushion retainer member 14. In this embodiment, it is preferred that the cross-sectional area of second cavity sections 79, 80 of die 10 be such that it will permit the slidable insertion of the cushion insert therethrough. Typically, the cross-sectional area of the second cavity sections, as well as opening 26 of attachment sleeves 19, 19', will be large enough so as not to obstruct or "catch" the channel member fabric of the cushion insert when the insert is axially introduced and passed through die 10.

As indicated in the Summary Of The Invention heading, and in order to facilitate the passage of the retainer member channel portions or flanges of the flanged cushion insert through the cavity of the die into the reaction housing, a lubricant, such as a paraffin-based wax, may be used to coat the outside area of the channel portions of the retainer member and/or inside walls of the cavities of die 10. A wax that is suitable to act as a lubricant for the purposes herein is available from Castrol Industrial of Los Angeles, Calif. under the trademark Castro Safety-Film® 639.

The method and assembly device according to the invention described above provides an inexpensive and economical means by which an inflatable cushion is coupled with a reaction housing in an inflatable restraint system. Alignment of a cushion insert with its corresponding reaction housing is automatically facilitated by the die described herein. This procedure also helps to protect the cushion during its introduction and insertion into the reaction housing member. Moreover, when a cushion retainer member is used for coupling an inflatable cushion to a reaction housing, a uniform compression and securement of the channel portion of the retainer about a cushion insert is obtained. The die thus prevents an overcrimping of the channel portion which might otherwise cause a loose fit to occur within the attachment sleeve thereby resulting in an undesirable noise in the system due to the "rattling" of the insert. Finally, less time and less individuals are required for coupling the cushion to the reaction housing on an assembly line which contributes to the economical production of an air bag module.

Since other modifications and changes may be varied to fit the particular operating requirements and environments of the invention, which will be apparent to those skilled in the art, the invention is not considered to be limited to the embodiments chosen for purposes of disclosure, and covers all changes and modifications which do not constitute departures from the true spirit and scope thereof.

What is claimed is:

1. A method for coupling an inflatable cushion with a reaction housing in an inflatable restraint system, said cushion having a throat including a channel extending therefrom, and a rod mounted within said channel to together define a cushion insert, and said reaction housing having an attachment sleeve and a housing slot communicating with the attachment sleeve, said cushion insert to be received within said attachment sleeve with said cushion throat extending through said housing slot, with said slot being smaller than said insert to thereby retain said cushion insert, said method comprising the steps of:

a) providing a die including (i) at least one cavity extending through the die to permit axial introduction of said cushion insert therethrough, and (ii) an elongate slot communicating with the interior of the cavity and disposed along the length thereof to permit passage of said throat therethrough;

b) axially aligning an outlet of the die cavity with said attachment sleeve provided in the reaction housing;

c) axially inserting said cushion insert into an inlet of the die cavity; and d) moving said cushion insert into said attachment sleeve of the reaction housing thereby coupling the inflatable cushion with the reaction housing of the inflatable restraint system.

2. The method according to claim 1 wherein the inlet of said cavity communicates with a first section of said cavity, said first section having inwardly tapered sides that terminate in a second section of said cavity, said second section having a cylindrical configuration ending with the outlet, the inlet of the cavity being of a greater cross-sectional area than the outlet.

3. The method according to claim 2 wherein the axial cross section of the second section relative to that of the attachment sleeve is such to permit passage of the cushion insert from the cavity of the die into the attachment sleeve.

4. The method according to claim 2 further including, prior to step c), the additional step of placing the cushion insert into a channel portion of a cushion retainer member to form a cushion retainer insert whose axial cross-sectional area is greater than that of the second section of the die, but less than the inlet, and wherein step c) further includes axially inserting said cushion retainer insert into said inlet of said die cavity, and step d) further includes moving the cushion retainer insert into said attachment sleeve.

5. The method according to claim 4 including the additional step of partially compressing the channel portion of the cushion retainer member about the insert before its introduction into the die cavity.

6. The method according to claim 4 wherein the cushion insert is a flanged cushion insert.

7. The method according to claim 4 further including, prior to step c), the additional step of applying a lubricant to the exterior of the channel portion of the cushion retainer member to facilitate the movement of the retainer member through the cavity of the die.

8. The method according to claim 1 wherein the cushion insert is a flanged cushion insert.

9. The method according to claim 8 wherein an axial cross-sectional area of the flanged cushion insert is greater than that of the second cavity section of the die, but less than the cavity inlet.

10. The method according to claim 1 wherein the die includes a plurality of the cavities to facilitate the axial passage of a corresponding number of the cushion inserts therethrough.

11. The method according to claim 10 wherein the die includes a pair of cavities spaced apart from each other in a substantially parallel relationship to facilitate the alignment and passage of a pair of the corresponding cushion inserts therethrough into corresponding ones of the attachment sleeves included in the reaction housing of the inflatable restraint system.

12. The method according to claim 1 further including, prior to step c), the additional step of applying a lubricant to the cavity to facilitate the movement of the cushion insert therethrough.

13. The method according to claim 12 wherein the lubricant is a paraffin-based wax.

14. The method according to claim 1 wherein the axial alignment of the cavity of the die with the attachment sleeve of the reaction housing is accomplished by fixing the die and reaction housing to a common fixture.

15. The method according to claim 1 wherein the axial alignment of the cavity of the die with the attachment sleeve of the reaction housing is accomplished by mounting the die to the reaction housing.

16. A method for securing an inflatable cushion insert within a channel portion of a cushion retainer member to form a cushion retainer insert which can facilitate the coupling of an inflatable cushion with a reaction housing in an inflatable restraint system, comprising the steps of:

a) providing a die comprising (i) at least one cavity extending through the die to receive said channel portion of said cushion retainer member, and (ii) an elongate slot communicating with the interior of the cavity and disposed along the length thereof to permit a remainder of said cushion retainer member to extend through said slot, and to permit axial introduction and passage of an inflatable cushion insert through the cavity;

b) placing the inflatable cushion insert into the channel portion of the cushion retainer member to form said cushion retainer insert; and c) moving the cushion retainer insert through the cavity of the die thereby obtaining a uniform securement of the channel portion about the cushion insert.

17. The method according to claim 16 wherein the cavity of the die includes an inlet opening of said cavity communicating with a first section of said cavity, said first section having inwardly tapered sides that terminate in a second section of said cavity, said second section having a cylindrical configuration ending with an outlet, the inlet opening of the cavity being of a greater cross-sectional area than the outlet.

18. The method according to claim 17 wherein the axial cross-sectional area of the cushion retainer insert is greater than that of the second section of the cavity, but less than that of the cavity inlet opening.

19. The method according to claim 16 further including, prior to step c), the additional step of partially compressing the channel portion of the cushion retainer member about the insert.

20. The method according to claim 16 wherein the cushion insert is a flanged cushion insert.

21. The method according to claim 16 wherein the die includes a plurality of the cavities to facilitate the axial passage of a corresponding number of the cushion retainer inserts therethrough.

22. The method according to claim 21 wherein the die includes a pair of the cavities spaced apart from each other in a substantially parallel relationship to facilitate the alignment and passage of a pair of the corresponding cushion retainer inserts therethrough.

23. The method according to claim 16 further including, prior to step c), the additional step of applying a lubricant to the cavity to facilitate the movement of the cushion retainer insert therethrough.

24. The method according to claim 23 wherein the lubricant is a paraffin-based wax.

* * * * *